United States Patent
Beguin et al.

(10) Patent No.: US 6,512,879 B1
(45) Date of Patent: Jan. 28, 2003

(54) GLASS COMPOSITION AND OPTICAL DEVICE MADE THEREFROM

(75) Inventors: Alain Beguin, Vulaines sur Seine (FR); Patrice Camy, Paris (FR); Pascale LaBorde, Corning, NY (US); Christian Lerminiaux, Fontainbleau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/355,091

(22) PCT Filed: Jan. 8, 1998

(86) PCT No.: PCT/US98/00496

§ 371 (c)(1),
(2), (4) Date: Nov. 3, 2000

(87) PCT Pub. No.: WO98/30507

PCT Pub. Date: Jul. 16, 1998

(Under 37 CFR 1.47)

(30) Foreign Application Priority Data

Jan. 14, 1997 (FR) .............................. 97 00271

(51) Int. Cl.[7] .......................... G02B 6/10; C03C 3/089; C03C 3/095
(52) U.S. Cl. ...................... 385/142; 385/123; 385/129; 501/64; 501/65; 501/95.1; 501/123; 501/126
(58) Field of Search ................................ 385/122–124, 385/129–132, 141, 142, 144; 501/37, 55, 64, 65, 72, 95.1, 95.2, 123, 126, 151, 152; 359/337.3, 341.1, 341.5, 342, 343; 372/6, 39–42, 68

(56) References Cited

U.S. PATENT DOCUMENTS

| | | | |
|---|---|---|---|
| 3,663,474 A | | 5/1972 | Lee et al. ............. 252/301.4 F |
| 3,935,018 A | * | 1/1976 | Ray et al. ...................... 501/46 |
| 5,039,631 A | | 8/1991 | Krashkevich et al. ......... 501/64 |
| 5,128,801 A | | 7/1992 | Jansen et al. ............... 359/343 |
| 5,483,628 A | * | 1/1996 | Borrelli et al. ............. 385/142 |
| 5,537,505 A | * | 7/1996 | Borrelli et al. ............. 385/142 |
| 5,598,491 A | * | 1/1997 | Ohya et al. ................... 385/24 |
| 5,659,644 A | * | 8/1997 | DiGiovanni et al. .......... 385/31 |
| 5,731,892 A | * | 3/1998 | DiGiovanni et al. ........ 359/341 |
| 6,150,027 A | * | 11/2000 | Yamamoto et al. ......... 428/426 |

OTHER PUBLICATIONS

Barnes et al. $Er^{3+}$ —$Yb^{3+}$ and $Er^{3+}$ Doped Fiber Lasers, Journal of Lightwave Technology, Oct. 1989, No. 10, p. 1461–1465, vol. 7.

* cited by examiner

Primary Examiner—John D. Lee
(74) Attorney, Agent, or Firm—Svetlana Z. Short; Patricia L. Ades

(57) ABSTRACT

Phosphate free, Er/Yb co-doped borosilicate glass compositions and optical devices made from said compositions are disclosed; said compositions comprising, for 100 parts by weight of: 60 to 70 parts by weight $SiO_2$ or $SiO_2+GeO_2$ with $SiO_2$ always being greater than 40 parts by weight, 8 to 12 parts by weight of $B_2O_3$, 10 to 25 parts by weight $M_2O$ wherein $M_2O$ is an alkali metal oxide, 0 to 3 parts by weight of BaO, 0.1 to 5 parts by weight $Er_2O_3$, and from 0.1 to 12 parts by weight of $Yb_2O_3$ and from 0 to less than 5 parts by weight F; and within which, the boron atoms are of tetrahedral spatial coordination.

14 Claims, 3 Drawing Sheets

GLASS COMPOSITION AND OPTICAL DEVICE MADE THEREFROM

The invention relates to a glass composition that is particularly suitable in optical devices, and more specifically, the invention relates to a phosphate-free, erbium/ytterbium co-doped borosilicate glass suitable in lasers and optical signal amplifiers, for example, bulk, planar waveguiding and fiber types. The invention relates also to said optical devices based on said glass composition.

The present invention relates to a glass composition which is particularly useful in the production and the functioning of optical devices which are capable of amplifying an optical signal. These types of device include, but are not limited to bulk glass lasers, planar lasers, planar waveguide optical amplifiers, and fiber lasers and amplifiers. The description of the invention which follows, relative to optical devices composed of the glass composition of the invention, is limited to planar optical amplifiers for convenience; however, those skilled in the art will appreciate the applicability of the glass composition of the invention to other types of optical devices mentioned above.

Moreover, waveguide fabrication techniques such as ion-exchange, sputtering, flame hydrolysis and chemical vapour deposition are well reported in the literature and need not be discussed herein for an understanding of the invention by one skilled in the art. U.S. Pat. No. 5,128,801 (Jansen et al.), e.g., incorporated herein by reference, describes a planar amplifier with a waveguide path integrated into a glass body. The glass body is doped with an optically active material such as a rare earth metal oxide. The signal to be amplified is transmitted through the waveguide; the pump power is coupled into the waveguide at one end, and an amplified signal is extracted from the waveguide at the other end of the waveguide. Erbium is a preferred optically active dopant for optical signal amplifying devices since, amongst other reasons, it has a fluorescence spectrum that conveniently encompasses the low loss 1550 nm third telecommunications window, and exhibits a long excited state lifetime in a glass host.

An ideal optical amplifying device will have short length, a high amplifier efficiency ($dB/mW_{PUMP}$), and a large gain coefficient (dB/cm). One limiting factor to the performance of erbium doped amplifiers is the glass host, the composition of which affects the excited state lifetime of the $Er^{3+}$ ions, the absorption and emission cross sections of the $Er^{3+}$ ions, and their bandwidth. In addition, the concentration of erbium in the host glass will significantly affect amplifier performance. For example, even at concentrations as low as 100 ppm in an erbium doped silica fiber, a phenomenon referred to as energy transfer up conversion can effectively quench the population inversion due to the clustering of $Er^{3+}$ ions and the resulting energy transfer between these clustered regions. While the effects of energy transfer up conversion can be greatly reduced by lowering the erbium concentration and increasing the length of the amplifier, this is in contrast to the desired amplifier characteristics mentioned above. For instance, it has been reported by Nykolak et al., "System evaluation of an $Er^{3+}$-doped planar waveguide amplifier", *IEEE Photon. Technol. Lett.*, 5, pp. 1185–1187, (1993), that $Er^{3+}$ concentrations as high as 10,000 ppm in a 4.5 cm planar waveguide amplifier produced only 15 dB gain for 280 mW of 980 nm pump power. Moreover, in a 4 cm $Tl^+$ ion-exchanged waveguide amplifier comprising Corning B1664 borosilicate host glass doped with 0.5% by weight of $Er_2O_3$ and pumped with 110 mW of 973 nm pump power, we observed an optimum performance of 3 dB net gain.

Accordingly, there is a recognized need for a glass composition suitable for use in making an optical amplifying device of the types described herein, that avoids the known disadvantages of phosphate glasses along with the other concerns such as those mentioned above and appreciated by those skilled in the glass and optical device arts, and that provides the spectroscopic and manufacturing advantages associated with phosphate containing glasses without the known disadvantages of phosphosilicate glass compositions.

Additional features and advantages of the invention will be set forth in the description which follows, and/or in part will be apparent from the description, and/or may be learned by practice of the invention. The objectives and other advantages of the invention will be realized and attained by the apparatus and compositions thereof as particularly pointed out in the written description and claims hereof as well as the appended drawings.

The present invention has therefore for first subject a phosphate-free, Er/Yb co-doped borosilicate glass composition, the glass composition comprising:
for 100 parts by weight made up of:
60 to 70 parts by weight of $SiO_2$ or $SiO_2+GeO_2$ with $SiO_2$ always representing more than 40 parts by weight, (preferably 65 to 68 parts by weight of $SiO_2$ or $SiO_2+GeO_2$),
8 to 12 parts by weight of $B_2O_3$ (preferably 11 to 12 parts by weight of $B_2O_3$),
10 to 25 parts by weight of $M_2O$ wherein $M_2O$ is at least one alkali metal oxide selected from the group consisting of the oxides: $Na_2O$ intervening at 0 to 20 parts by weight, $K_2O$ intervening at 0 to 20 parts by weight and $Li_2O$ intervening at 0 to 10 parts by weight,
0 to 3 parts by weight of BaO (preferably 0 to 1 part by weight of BaO),
0.01 to 5 parts by weight of $Er_2O_3$ (preferably 0.5 to 3 parts by weight of $Er_2O_3$),
from 0.1 to 12 parts by weight of $Yb_2O_3$ (preferably from 1 to 10 parts by weight of $Yb_2O_3$) and from 0 to less than 5 parts by weight of F; and containing the boron atoms, of tetrahedral spatial coordination (for a concentration of $B_2O_3$ of less than 12%), which is known for increasing the lifetime of the $Er^{3+4}I_{13/2}$ metastable state.

The glass compositions of the invention, such as those characterized above, are original, always in keeping close to prior art borosilicate glasses, such as those referenced Corning B1664 or Schott BK-7, known to be easy to process and melt, relatively inexpensive to make, reliable, resistant to chemicals and insensitive to humidity.

The glass compositions of the invention are based on silica. Nevertheless, germanium (another element of column IV of the periodic table of the elements) can in part be substituted for silicon, for an equivalent result, which does not surprise the person skilled in the art. The intervention of germanium oxide can notably allow a slight increase in the refractive index. Said glass compositions of the invention contain:
either from 60 to 70 parts by weight of silica ($SiO_2$),
or from 60 to 70 parts by weight of $SiO_2+GeO_2$, silica always representing more than 40 parts by weight of the $SiO_2+GeO_2$ mixture.

The composition of the invention ensures that the boron atoms are of tetrahedral spatial coordination in order to avoid quenching of the population inversion, while the alkaline oxides, in the amounts indicated, aid glass melting and help maintaining a refractive index of about 1.5, which is essentially the same as that of silica.

Fluorine, F intervenes advantageously to improve melting and fining the glass, to modify the refractive index of said glass, and to improve the exchange properties of the ions of the composition. The intervention of said fluorine in amounts greater than those recommended ($\geq 5$ parts by weight, for 100 parts by weight of [$SiO_2+GeO_2+B_2O_3+M_2O+BaO+Er_2O_3$]) tends to render the glass opalescent. The intervention of said fluorine generally reveals to be advantageous from 0.1 parts by weight.

The presence of ytterbium ($Yb_2O_3$) in the amounts indicated increases the the level of inversion of the $Er^{3+}$ ions for a given pump power, and Yb, besides having a strong absorption at 980 nm, ensures an efficient energy transfer to the $Er^{3+}$ ions when the concentrations of co-dopants are sufficiently high. Moreover, higher erbium levels seem to be possible in the presence of ytterbium, this being apparently due to a decreased clustering of the $Er^{3+}$ ions in the presence of ytterbium.

According to an advantageous embodiment of the invention, the glass composition contains BaO and $M_2O$ in amounts such as:

[$BaO+0.5 (Li_2O+Na_2O+K_2O)$] represents from 5 to 12 parts by weight of the 100 parts by weight [$SiO_2+GeO_2+B_2O_3+M_2O+BaO+Er_2O_3$].

Elements such as $Sb_2O_3$ and/or $As_2O_3$ may also be present in the composition in a total amount representing up to 2 parts by weight, for 100 parts by weight of [$SiO_2+GeO_2+B_2O_3+M_2O+BaO+Er_2O_3$], for fining purposes and/or for increasing the solubility of the erbium.

According to another aspect of the invention, the molar ratio K/Na is greater than one (1) for the purpose of optimizing the thallium ion exchange ability characteristics of the composition, for making a highly confined and high index waveguide.

According to yet another aspect of the invention, the glass compositions of said invention advantageously possess a refractive index of about 1.5.

Said compositions of the invention are perfectly convenient as lasers or optical amplifiers. Their use for these purposes constitutes another subject of the invention. Similarly, the present invention relates to optical devices which comprise a waveguide in their structure, said waveguide containing a glass composition of the invention. Classically, said waveguide possesses a core and a cladding. Characteristically, said core i.e. said core and said cladding is/are of a glass composition of the invention. According to an embodiment variant, the oxides $Er_2O_3$ and $Yb_2O_3$ are only substantially present in the core of such a device of the invention.

Optical devices of the invention may notably consist of fiber or planar waveguides.

An embodiment of the invention also contemplates that, in the case of an optical signal amplifying device, said device may require one or more passive sections for monitoring or multiplexing, for example, in addition to an optical signal amplifying section. The passive sections are of a very similar or identical composition to that of the active section with the exception that no optical signal amplifying dopants such as erbium and ytterbium will be part of the passive section composition. The inclusion of optical signal amplifying dopants in the passive section could result in absorption losses that are not overcome by pumping radiation. It is appreciated that the refractive index throughout a monolithic device according to this embodiment will be substantially uniform among the different sections to avoid any reflections at the interfaces between the two sections of the resulting monolithic device. An aspect of this embodiment includes the passive section being doped with a transparent rare earth, i.e. lanthanum, to adjust the refractive index of the portions of the device not doped with erbium or other optical signal amplifying dopants.

According to this embodiment, the invention covers monolithic optical devices, including waveguides possessing a core and a cladding, comprising a passive, optical signal non-amplifying section and an active, optical signal amplifying section, said devices being characterized by a phosphate-free borosilicate glass composition which possesses refractive indices substantially uniform throughout respectively said cores and claddings of said active and passive sections, said glass composition of said passive section comprising:

from 60 to 70 parts by weight of $SiO_2$ or $SiO_2+GeO_2$ with $SiO_2$ always representing more than 40 parts by weight, from 8 to 12 parts by weight of $B_2O_3$, from 10 to 25 parts by weight of $M_2O$ wherein $M_2O$ is such as defined previously, from 0 to 3 parts by weight of BaO and from 0 to less than 5 parts by weight of F for 100 parts by weight of [$SiO_2+GeO_2+B_2O_3+M_2O+BaO$];

but excluding the substantial presence of an optical signal amplifying elementary component; and, said glass composition of said active section comprising, for 100 parts by weight made up of:

60 to 70 parts by weight of $SiO_2$ or $SiO_2+GeO_2$ with $SiO_2$ always representing more than 40 parts by weight, 8 to 12 parts by weight of $B_2O_3$, 10 to 25 parts by weight of $M_2O$ wherein $M_2O$ is such as defined previously, 0 to 3 parts by weight of BaO, 0.01 to 5 parts by weight of $Er_2O_3$, from 0.1 to 12 parts by weight of $Yb_2O_3$ and from 0 to less than 5 parts by weight of F;

said glass compositions of said passive and active sections containing the boron atoms of tetrahedral spatial coordination.

Advantageously, as indicated above in a general way, said glass compositions of active and passive sections possess the following characteristics:

[$BaO+0.5 (Li_2O+Na_2O+K_2O)$] represent from 5 to 12 parts by weight (with reference to the 100 parts by weight, [$SiO_2+GeO_2+B_2O_3+M_2+BaO$] for the passive section, [$SiO_2+GeO_2+B_2O_3+M_2O+BaO+Er_2O_3$] for the active section);

they contain at least one of the oxides: $Sb_2O_3$ and $As_2O_3$ in a total amount which can range up to 2 parts by weight, for 100 parts by weight [$SiO_2+GeO_2+B_2O_3+M_2O+BaO$] of the passive section and 100 parts by weight [$SiO_2+GeO_2+B_2O_3+M_2+BaO+Er_2O_3$] of the active section.

According to a preferred embodiment variant, the oxides $Er_2O_3$ and $Yb_2O_3$ only intervene in substantial amounts in the core of the active section.

The present invention provides phosphate-free borosilicate glass compositions which are particularly convenient in the manufacture of optical devices, used for amplifying optical signals by stimulated emission, comprising notably bulk glass lasers and fiber and planar waveguide lasers and amplifiers, in which the glass composition has unique characteristics which convey an increased amplification efficiency and other advantages described below.

One characteristic of the glass composition, subject of the present invention, is the incorporation, up to 12 parts by weight, of ytterbium oxide, in the presence of relatively large amounts (up to 5 parts by weight) of erbium oxide. The borosilicate glass composition of the invention is founded, in a large part, on our discovery that the co-presence of ytterbium and erbium in said composition, in the amounts described herein, is responsible for a relatively high efficiency energy transfer (50% or more) between the excited state of ytterbium and the excited state of erbium, which generates an improved pumping efficiency and performance compared to those generated by any similar composition containing a single fluorescent dopant (e.g. erbium), of which we are aware (see FIG. 3 annexed). Moreover, the glass compositions according, to the invention are characterized in that they contain the boron in a tetrahedral coordination (for a concentration of $B_2O_3$ of less than 12%), which is known for increasing the lifetime of the $Er^{3+4}I_{13/2}$ metastable state. Furthermore, better pumping efficiency in an exemplary ion-exchanged planar waveguide amplifier was achieved when the disclosed amounts of ytterbium and erbium were present in the glass composition apparently due to decreased clustering of the erbium ions.

Alkali metal oxides such as $Na_2O$ and/or $K_2O$ and/or $Li_2O$ are present. The amount of these monovalent oxides is critical to obtain a glass that is easy to melt and of good optical quality, having high transmission and low refractive index. Barium oxide (BaO) advantageously intervenes in an amount less than or equal to 3 parts by weight, as network modifier. The intervention of said barium oxide is generally advantageous from 0.1 parts by weight. At present, there is a reluctance to include other network modifiers such as Ca or Mg in the composition due to a risk of phase separation in the glass.

In a preferred embodiment of the glass composition of the invention, ($M_2O+RO$), where M is Li, Na or K, and R is Ba, should be such that $BaO+(0.5)(Li_2O+Na_2O+K_2O)$] represents from 5 to 12 parts by weight for 100 parts by weight of [$SiO_2+GeO_2+B_2O_3+M_2O+BaO+Er_2O_3$].

While most of the glass compositions of the invention exemplified hereafter contain K/Na in a ratio of about 0.9, certain ones have been optimized for a thallium ion exchange and possess a K/Na molar ratio greater than 1, as in the composition of the Example VIII of Table 3.

The accompanying drawings are included to provide a better understanding of the invention. They are incorporated in and constitute a part of this specification. Said drawings illustrate embodiments of the invention and together with the description serve to explain the principles of the invention.

Said drawings consist of FIGS. 1 to 4 set forth hereafter:

Figure 1:
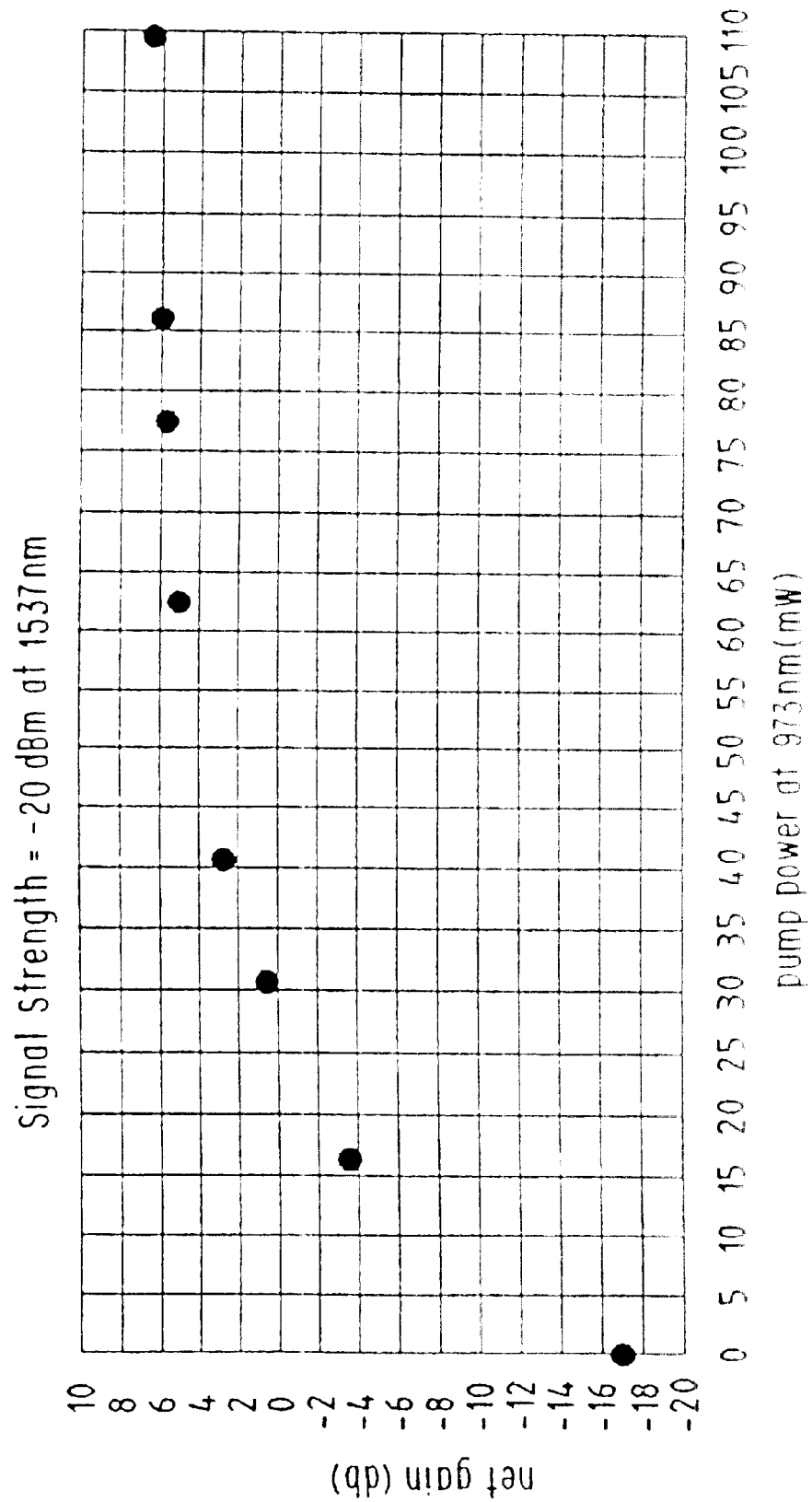
FIG. 1 shows a graph of net gain (dB) (on the ordinate) versus pump power (mW) (on the abcissa) at 973 nm for a 3.8 cm long waveguide device according to an embodiment of the invention i.e. having a glass composition such as described in Example A and having the glass composition given in Example III of the Table 3.

Table 1 sets forth the essential constituent amounts of the glass compositions of the invention. Table 2 hereafter defines narrower, preferred ranges for said glass compositions. Table 3 sets forth exemplary compositions, including those in which we have observed an improved performance from a planar waveguide amplifier according to an embodiment of the invention, compared to a single constituent doped device operating under the same conditions. The compositions are set forth in parts by weight with $Yb_2O_3$ and fluorine F (intervening as fluorosilicate of sodium or fluorosilicate of potassium) indicated above in parts by weight, for 100 parts by weight of the composition [$SiO_2+GeO_2+B_2O_3+M_2O+BaO+Er_2O_3$]. The amounts indicated represent the parts by weight prior to melting of the composition. Example VI is an opalescent glass which does not make part of the context of the invention, due to the high fluorine concentration; however, the presence of fluorine, preferably in the form of fluorosilicate of sodium or fluorosilicate of potassium, is of benefit for melting and fining, index adjustment, and it allows increasing ion exchangeability performances of ions of the compositions of the invention.

Table 1

Compositions of the invention:

from 0.1 to 12 parts by weight of $Yb_2O_3$, from 0 to less than 5 parts by weight of F, for 100 parts by weight made up of:

60 to 70 parts by weight of $SiO_2$ or $SiO_2+GeO_2$ with $SiO_2$ always representing more than 40 parts by weight, 8 to 12 parts by weight of $B_2O_3$, 10 to 25 parts by weight of $M_2O$ wherein $M_2O$ is at least one alkali metal oxide selected from the group consisting of the oxides: $Na_2O$ intervening at 0 to 20 parts by weight, $K_2O$ intervening at 0 to 20 parts by weight and $Li_2O$ intervening at 0 to 10 parts by weight, 0 to 3 parts by weight of BaO, 0.01 to 5 parts by weight of $Er_2O_3$, with the boron element in a tetrahedral spatial coordination.

Table 2

Particularly preferred compositions of the invention:

from 1 to 10 parts by weight of $Yb_2O_3$, from 0 to less than 5 parts by weight of F, for 100 parts by weight made up of:

65 to 68 parts by weight of $SiO_2$ or $SiO_2+GeO_2$ with $SiO_2$ always representing more than 40 parts by weight, 11 to 12 parts by weight of $B_2O_3$, 10 to 25 parts by weight of $M_2O$ wherein $M_2O$ is at least one alkali metal oxide selected from the group consisting of the oxides: $Na_2O$ intervening at 0 to 20 parts by weight, $K_2O$ intervening at 0 to 20 parts by weight and $Li_2O$ intervening at 0 to 10 parts by weight, 0 to 1 part by weight of BaO, 0.5 to 3 parts by weight of $Er_2O_3$, with [$BaO+0.5 (Li_2O+Na_2O+K_2O)$] representing from 5 to 12 parts by weight of said 100 parts by weight.

TABLE 3

Examples of compositions of the invention*: (compositions given in parts by weight)

| | example I | example II | example III | example IV | example V | example VI** | example VII | example VIII |
|---|---|---|---|---|---|---|---|---|
| $SiO_2$ | 67.5 | 68 | 66.5 | 65.5 | 66.5 | 65.5 | 65.5 | 65.5 |
| BaO | 0.6 | 0.6 | 0.6 | 0.6 | 0.6 | 0.6 | 0.6 | 0.6 |
| $B_2O_3$ | 11.6 | 11.6 | 11.6 | 11.6 | 11.6 | 11.6 | 11.6 | 11.6 |
| $Na_2O$ | 10 | 10 | 10 | 10 | 10 | 10 | 10 | 3.8 |
| $K_2O$ | 9 | 9 | 9 | 9 | 9 | 9 | 9 | 17.6 |
| $Sb_2O_3$ | 0.1 | 0.1 | 0.1 | 0.1 | 0.1 | 0.1 | 0.1 | 0.1 |
| $Er_2O_3$ | 1 | 0.5 | 2 | 3 | 2 | 3 | 3 | 1 |
| $Yb_2O_3$ | 5 | 5 | 5 | 5 | 1 | 2 | 2 | 2 |
| F | 0 | 0 | 0 | 0 | 0 | 5 | 2.5 | 0 |

*$\Sigma(SiO_2 + BaO + B_2O_3 + Na_2O + K_2O + Er_2O_3) = 100 \pm 0.3$ parts by weight.
**The composition of Example VI does not make part of the context of the invention (opalescent glass).

An exemplary device according to an embodiment of the invention was prepared by first melting a glass composition as defined above, and forming a substrate thereof, by techniques well understood in the glass art. The substrate was selectively masked according to conventional photo lithographic practice to define a waveguiding region preferably 2 microns to 5 microns in width. The masked substrate was then exposed in a pure thallium salt bath to exchange sodium and/or potassium ions and/or lithium ions by thallium ions. The salt bath had a temperature of about 400° C., and exposure in the bath lasted for about 1.5 hours, which was sufficient for creating an ion exchanged waveguiding region in the exposed surface of the glass substrate. The process was optionally carried out in the presence of an applied electric field.

A second ion exchange was then carried out to bury the waveguiding region deeper into the substrate, comprising the steps of contacting the masked glass substrate with a fused salt melt containing 95% potassium ions and 5% sodium ions at a temperature of about 450° C. for approximately one hour. The buried glass substrate was subjected to an electric current of about 30 mA.

EXAMPLES OF DEVICES OF THE INVENTION

Example A

A planar waveguide optical signal amplifying device according to an embodiment of the invention was constructed as described above. Its glass has the composition given in Example III of Table 3. The waveguide was 3.8 cm in length and was pumped at 973 nm with a pump power of 110 mW. A net gain of 6.1 dB was measured as is shown in FIG. 1.

Example B

Figure 2:
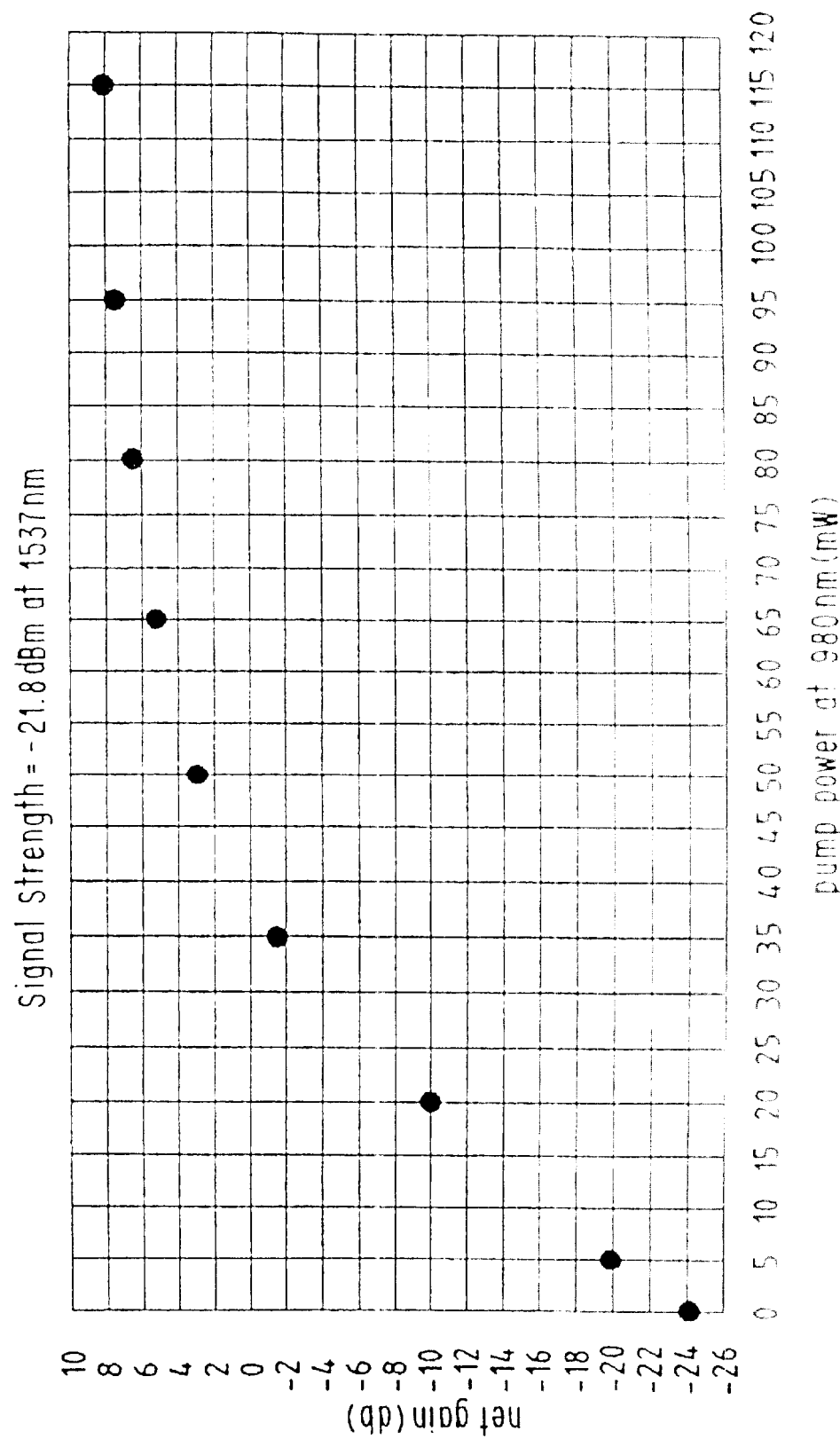
FIG. 2 is a plot similar to that in FIG. 1 showing a graph of net gain (dB) versus pump power (mW) at 973 nm for a 3.8 cm long waveguide device according to an embodiment of the invention such as described in Example B and having the glass composition as given in Example IV of the Table 3.
Figure 3:
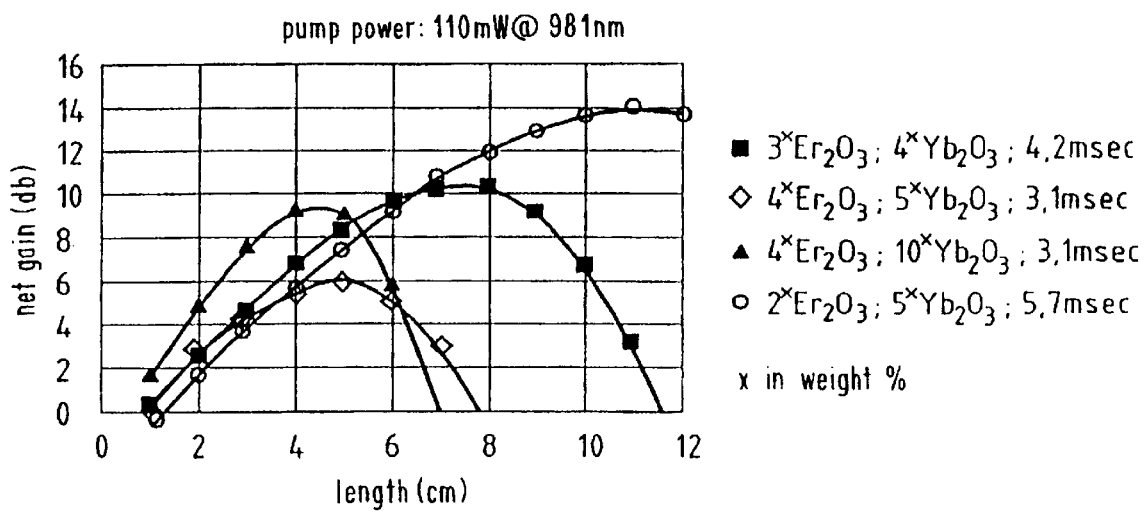
FIG. 3 shows the measured net gain (dB) as a function of the length of a planar waveguide amplifier of the invention for four different amounts of the co-dopants: $Er_2O_3$ and $Yb_2O_3$, expressed in parts by weight (see later)

A planar waveguide optical signal amplifying device according to an embodiment of the invention was constructed as described above. Its glass has the composition given in Example IV in Table 3. The waveguide was 3.8 cm in length and was pumped at 973 nm with a pump power of 110 mW. A net gain of 8 dB was measured as is shown in FIG. 2.

The values given in these non-limiting examples are to be compared to those obtained with our best single element (erbium) doped planar waveguide amplifier which contained 0.5% by weight of erbium oxide and no ytterbium oxide, and which exhibited a 3 dB net gain when pumped at 973 nm with 110 mW of pump power.

Figure 4:
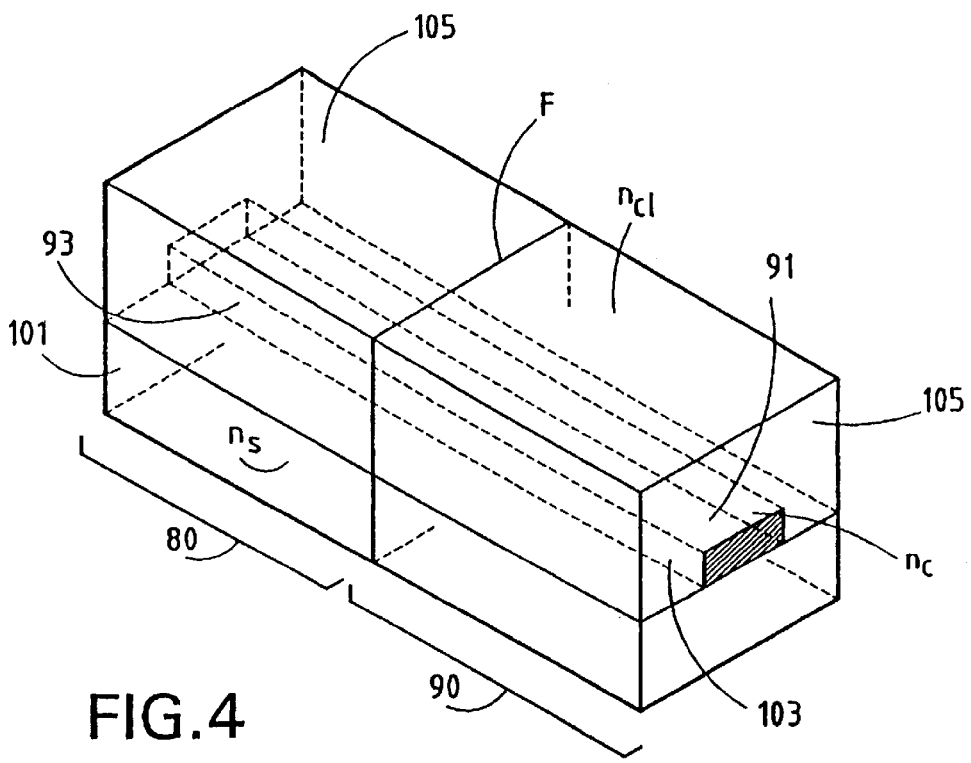
FIG. 4 shows a perspective schematic view of a monolithic optical device which comprises a waveguiding region in which the device comprises a passive, optical signal non-amplifying section and an active, optical signal amplifying section.

A monolithic optical device according to an embodiment of the invention is shown schematically in FIG. 4. The device includes a passive, non-optical signal amplifying section 80 and an active, optical signal amplifying section 90, that are fused (F) or joined together by any other technique of joining well known to those skilled in the art and that require no further explanation herein. The composition of the passive section 80 and the active section 90 are very similar if not substantially identical with the exception that the passive section does not contain an optical signal amplifying dopant such as erbium, for example, while the active section 90 is of the composition described in the description of the present invention including therefore co-dopants erbium and ytterbium. The passive section 80 may be doped with a transparent rare earth element, e.g. lantanium, in order to make the refractive index of the passive section 80 and the active section 90 substantially identical to avoid unwanted reflection at the interface between the two sections. The device includes a substrate portion 101 made from silica or silicon, for example, having a refractive index designated $n_s$, a waveguiding region 103 having a glass composition according to the invention described herein. The active section 91 of the waveguiding region 103 contains the rare earth amplifying dopants, while the passive section 93 of the waveguiding region 103 does not include the optical signal amplifying dopants. The device is then overclad with a layer 105 with a material having a refractive index $n_{cl}$ less than $n_c$.

In a preferred aspect of this embodiment, the substrate 101 has a waveguiding layer 103 deposited thereupon, the waveguiding layer 103 being the Er/Yb containing glass composition described herein. By well known lithography and etching techniques, the waveguide cores are formed in layer 103, wherein the optical signal amplifying dopants included in the composition described herein are present. The device is then overclad with another material that is non-erbium doped to confine the optical signal to the waveguiding region. In this embodiment, it will be appreciated that the inventive glass composition (described herein) should only be present in critical areas of a monolithic device according to the invention A family of phosphate-free, borosilicate glass compositions and optical devices made therefrom, have been described. It will be apparent to those skilled in the art that various modifications and variations can be made in the devices and compositions of the present invention without departing from the scope of the invention. Thus, it is intended that the present invention covers these modifications and/or variations, provided they come within the scope of the appended claims and/or constitute equivalents of the claimed means.

What is claimed is:

1. A phosphate-free, Er/Yb co-doped borosilicate glass composition, comprising, for 100 parts by weight made up of
   (i) 60 to 70 parts by weight of $SiO_2$ or $SiO_2+GeO_2$ with $SiO_2$ always representing more than 40 parts by weight,
   (ii) 8 to 12 parts by weight of $B_2O_3$,
   (iii) 10 to 25 parts by weight of $M_2O$ wherein $M_2O$ is at least one alkali metal oxide selected from the group consisting of the oxides; $Na_2O$ intervening at 0 to 20 parts by weight, $K_2O$ intervening at 0 to 20 parts by weight and $Li_2O$ intervening at 0 to 10 parts by weight,
   (iv) 0 to 3 parts by weight of BaO,
   (v) 0.01 to 5 parts by weight of $Er_2O_3$,
   (vi) from 0.1 to 12 parts by weight of $Yb_2O_3$ and from 0 to less than 5 parts by weight of F;
   and within which the boron atoms are of tetrahedral spatial coordination.

2. The composition according to claim 1, characterized in that, within it:
   $[BaO+0.5(Li_2O+Na_2O+K_2O)]$ represents from 5 to 12 parts by weight of said 100 parts by weight of $[SiO_2+GeO_2+B_2O_3+M_2O+BaO+Er_2O_3]$.

3. The composition according to one of claims 1 or 2, characterized in that it comprises, for 100 parts by weight made up of:
   (i) 65 to 68 parts by weight of $SiO_2$ or $SiO_2+GeO_2$ with $SiO_2$ always representing more than 40 parts by weight,
   (ii) 11 to 12 parts by weight of $B_2O_3$,
   (iii) 10 to 25 parts by weight of $M_2O$,
   (iv) 0 to 1 parts by weight of BaO,
   (v) 0.5 to 3 parts by weight of $Er_2O_3$,
   (vi) from 1 to 10 parts by weight of $Yb_2O_3$ and from 0 to less than 5 parts by weight of F.

4. The composition according to claim 1, characterized in that it further includes at least one of the oxides: $Sb_2O_3$ and $As_2O_3$, in a total amount representing up to 2 parts by weight, for 100 parts by weight of $[SiO_2+GeO_2+B_2O_3+M_2O+BaO+Er_2O_3]$.

5. The composition according to claim 1, characterized by a molar ratio of: K/Na>1.

6. The composition according to claim 1, characterized in that it possesses a refractive index of about 1.5.

7. The composition according to claim 1 for use as a laser or as an optical amplifier.

8. An optical device, comprising a waveguide possessing a core and a cladding, characterized in that at least the core of said waveguide is a glass composition according to claim 1.

9. The optical device according to claim 8, characterized in that the oxides $Er_2O_3$ and $Yb_2O_3$ are present substantially only in the core.

10. The optical device according to one of claims 8 or 9 which comprises a fiber waveguide or a planar waveguide.

11. A monolithic optical device including a waveguide possessing a core and a cladding, comprising an optical signal non-amplifying passive section and an optical signal amplifying active section, said device being characterized by a phosphate-free borosilicate glass composition having substantially uniform refractive indices throughout respectively said cores and claddings of said passive and active sections, said glass composition of said passive section comprising:
   (i) 60 to 70 parts by weight of $SiO_2$ or $SiO_2+GeO_2$ with $SiO_2$ always representing more than 40 parts by weight,
   (ii) from 8 to 12 parts by weight of $B_2O_3$
   (iii) from 10 to 25 parts by weight of $M_2O$ wherein $M_2O$ is such as defined in claim 1,
   (iv) 0 to 3 parts by weight of BaO and
   (v) from 0 to less than 5 parts by weight of F for 100 parts by weight of $[SiO_2+GeO_2+B_2O_3+M_2O+BaO]$;
   but excluding the substantial presence of an optical signal amplifying elemental component;
   and, said glass composition of said active section comprising, for 100 parts by weight made up of:
   (i) 60 to 70 parts by weight of $SiO_2$ or $SiO_2+GeO_2$ with $SiO_2$ always representing more than 40 parts by weight,
   (ii) 8 to 12 parts by weight of $B_2O_3$
   (iii) 10 to 25 parts by weight of $M_2O$ wherein $M_2O$ is such as defined in claim 1,
   (iv) 0 to 3 parts by weight of BaO,
   (v) 0.01 to 5 parts by weight of $Er_2O_3$,
   (vi) from 0.1 to 12 parts by weight of $Yb_2O_3$ and from 0 to less than 5 parts by weight of F;
   said glass compositions of said passive and active sections containing the boron atoms of tetrahedral spatial coordination.

12. The optical device according to claim 11, characterized in that, within said glass compositions:
   $[BaO+0.5(Li_2O+Na_2O+K_2O)]$ represents from 5 to 12 parts by weight, with reference to said 100 parts by weight $[SiO_2+GeO_2+B_2O_3+M_2O+BaO]$ for the passive section, $[SiO_2+GeO_2+B_2O_3+M_2O+BaO+Er_2O_3]$ for the active section.

13. The optical device according to one of claims 11 or 12, characterized in that said glass compositions further comprise at least one of the oxides: $Sb_2O_3$ and $As_2O_3$, in a total amount representing up to 2 parts by weight for 100 parts by weight of $[SiO_2+GeO_2+B_2O_3+M_2O+BaO]$ of the passive section and 100 parts by weight of $[SiO_2+GeO_2+B_2O_3+M_2O+BaO+Er_2O_3]$ of the active section.

14. The optical device according to claim 11, characterized in that the oxides $Er_2O_3$ and $Yb_2O_3$ are present substantially only in the core of the active section.

* * * * *